United States Patent

[11] 3,573,856

[72] Inventors Dennis R. Best;
William J. Watson, Richardson, Tex.
[21] Appl. No. 836,071
[22] Filed June 24, 1969
[45] Patented Apr. 6, 1971
[73] Assignee Texas Instruments Incorporated
Dallas, Tex.

[54] DISTRIBUTED PRIORITY OF ACCESS TO A COMPUTER UNIT
8 Claims, 8 Drawing Figs.

[52] U.S. Cl. .... 340/172.5
[51] Int. Cl. .... G06f 9/18
[50] Field of Search .... 340/172.5; 235/157

[56] References Cited
UNITED STATES PATENTS 3,333,252 7/1967 Shimabukuro .... 340/172.5
3,377,621 4/1968 Hittel et al. .... 340/172.5
3,449,722 6/1969 Tucker .... 340/172.5
3,513,445 5/1970 Harmon et al. .... 340/172.5

OTHER REFERENCES

" Dynamic Priority Assignment Circuit" , C. R. Gordon, pp. 1331— 2, Vol. 9 No. 10, March 1967 IBM Technical Disclosure Bulletin.

" Service Priority Polling Arrangement" , D. Mackie et. al., pp. 122— 3, Vol. 10 No. 2, July 1967 IBM Technical Disclosure Bulletin.

*Primary Examiner*—Paul J. Henon
*Assistant Examiner*—Harvey E. Springborn
*Attorneys*—Samuel M. Mims, Jr., James O. Dixon, Andrew M. Hassell, Harold Levine, Rene E. Grossman, Melvin Sharp and Richards, Harris and Hubbard

ABSTRACT: Priority of access, as between a plurality of users, to a computer element such as a memory module is controlled by establishing a fixed priority sequence and, in response to each completion of access to such module, shifting the starting point in said fixed priority sequence from one point to another in the sequence order.

DISTRIBUTED PRIORITY OF ACCESS TO A COMPUTER UNIT

This invention relates to digital computers where a plurality of users vie for access to one or more computer elements such as memory modules. In a more specific aspect, the invention relates to a distributed priority operation wherein a fixed priority sequence as between users is established and wherein the starting point in said sequence is sequentially shifted in response to completion of each access to a given element.

In digital computer systems it is often desirable to share a common facility such as a memory module among several users. In such operation there is a need for control of priority in order to determine which user gets access to a computer facility at any given time. There are several commonly used methods for establishing user priority. A fixed priority is common wherein there is an established order of importance among users of the facility. Each time a facility becomes available for use, the most important user, the one having highest priority is allowed to use the facility. With this method, the highest priority user conceivably may monopolize the facility.

It has been found desirable to equally divide the resources of the facility among the several users on a demand basis. That is, all active users of the facility get an equal share of the resources. The present invention provides for such facility sharing in implementing a distributed priority among users. It selects by a state in a count cycle of N counts the highest priority request from one of N users whose priorities are related one to the other by a fixed priority sequence. The selection for each has a different starting point. More particularly, if a priority count is zero, the winner of the fixed priority vie with the requests ordered 0, 1...N is granted priority and, if the count is one, the winner of the fixed priority vie with requests ordered 1, 2...N, 0 is granted priority, etc. Each time any request obtains priority, a counter is incremented in the above count cycle.

Provision is further made for selecting between distributed priority logic and straight fixed priority vie.

In accordance with the invention, control of access of a computer element between a plurality of N users involves establishing a fixed priority sequence as between said users. Thereafter a counting cycle is established of order N. The count in the counting cycle is incremented following each access to the element and in response to each of a plurality of successive element access complete signals. In response to incrementing the counting cycle, the starting point in the fixed priority sequence is shifted one step. By this means, all users vying for access to the element will be assured of access upon request at least once during the counting cycle.

The means for carrying out the invention preferably involve a computer unit of fixed hardware, but may involve software. In either case, means are provided for establishing a fixed priority sequence for access to a computer module as between N users vying therefor. A counter means establishes a counting cycle of order N. Actuating means are provided for stepping one count in the counting cycle following each access to the module in response to each of a plurality of successive memory access complete signals. Means are then provided in response to incrementing of the counter which shift the priority starting point one step in the priority sequence. In its broadest aspect, the invention involves establishing a fixed priority sequence as between N users and in response to completion of each access to the unit vied for the starting point in the fixed priority sequence is shifted one step.

For further understanding of the present invention and for further advantages thereof, reference may now be had to the following description taken in conjunction with the accompanying drawings in which.

Figure 1:
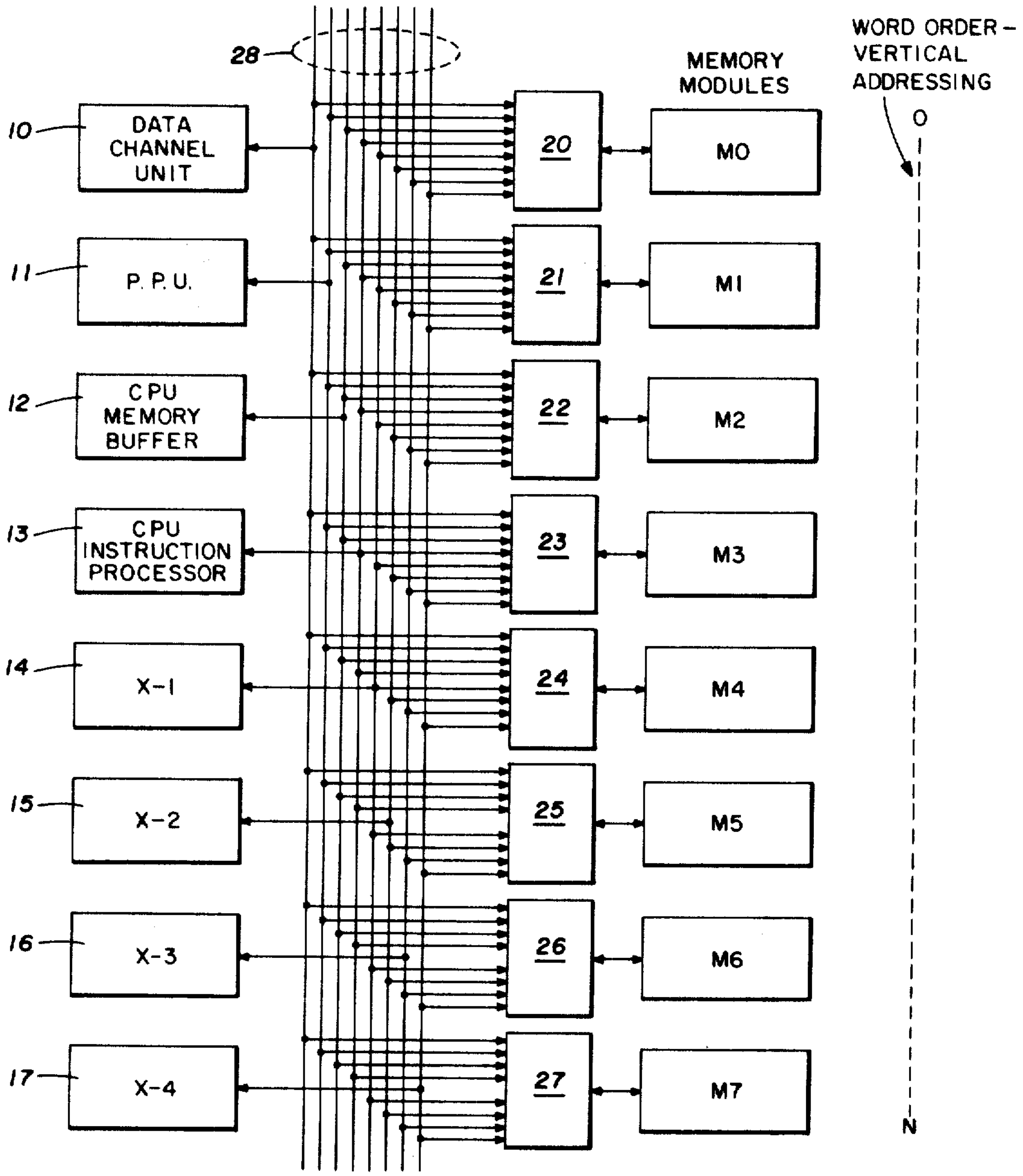
FIG. 1 is a block diagram illustrating the invention wherein eight users vie for access to eight memory modules.

Referring to FIG. 1, eight user units are shown at the left, unit 10 is a data channel unit which seeks access to memory modules M0—M7. A peripheral processor unit (PPU) 11 also vies for access to memory with unit 10, with the central processor unit memory buffer 12 and central processor unit instruction processor 13. Additional users 14—17 also vie for access to memory.

In the system to be described herein, provision is made for selecting between a fixed priority between users 10—17 and a distributed priority.

When on distributed priority, provision is made for shifting sequentially the order of priority among the users 10—17. This is accomplished by providing priority units 20—27. Each of the users 10—17 is connected to each of the priority units 20—27 by way of a bus 28.

FIGS. 1 & 2—ADDRESSING

Figure 2:
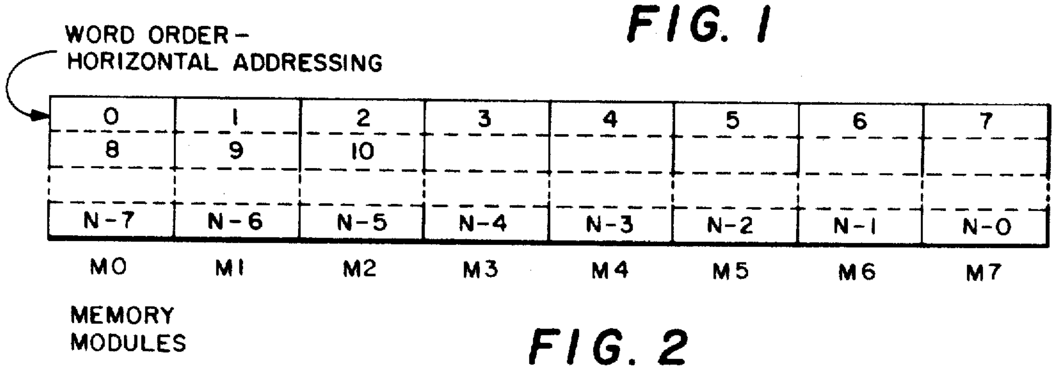
FIG. 2 illustrates word order in a horizontal memory addressing scheme.

In FIG. 1 it will be noted that one mode of addressing has been indicated, namely, vertical addressing. In vertical addressing, the words 0—N are entered seriatim in the memory modules M0—M7, filling module M0 first, then module M1, then module M2...Mn. Vertical addressing is generally preferred if reliability is the controlling factor. On the other hand, where speed is controlling, reliability is sometimes sacrificed in order to utilize horizontal addressing. Horizontal addressing is illustrated in FIG. 2 where words are stored with word 0 in the first address in memory M0, word 1 in the address No. 1 in memory M1, word 2 in address No. 1 in memory M3 and so on.

The present invention is particularly useful in connection with systems utilizing horizontal addressing.

The priority logic provided by the present invention in a preferred embodiment is a unit of hardware forming a part of the control of an automatic data processing machine such as high speed digital computers. While the preferred embodiment of the invention is in the form of a wired module and, thus, is hardware, the control may also be replaced by software.

Priority logic is employed which selects the highest priority request from one of N fixed priority vies, each with a different starting point. In the example illustrated in FIG. 1, there are eight users each seeking access to eight memory modules. If a control count, which will hereinafter be described, is zero, the winner of the fixed priority vie with the request ordered 0,1...7 is granted priority. If the count is one, the winner of the fixed priority vie with request ordered 1,2...7, 0 is granted priority. This sequence is repeated throughout order 0—7. Each time any request obtains priority a counter is incremented. Provision is made for selecting between distributed priority and fixed priority, such that the logic immediately reverts to a straight fixed priority vie if distributed priority is not selected. Furthermore, provision is made for distributing the priority between the four users 10—13 in one mode of or for distributed priority among users 10—17 in another mode.

Figure 3:
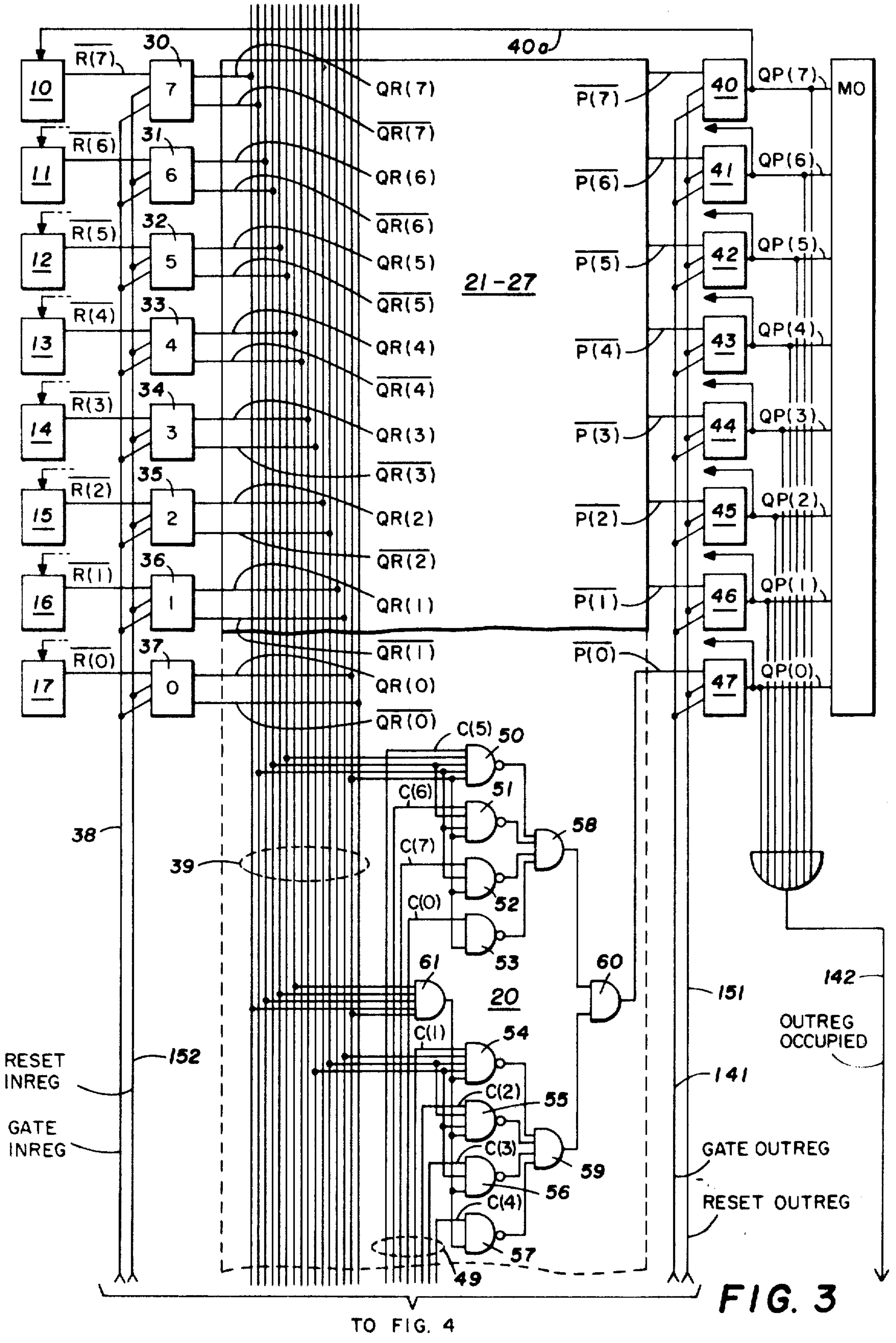
FIG. 3 illustrates one of the eight priority units of FIG. 1.
Figure 4:
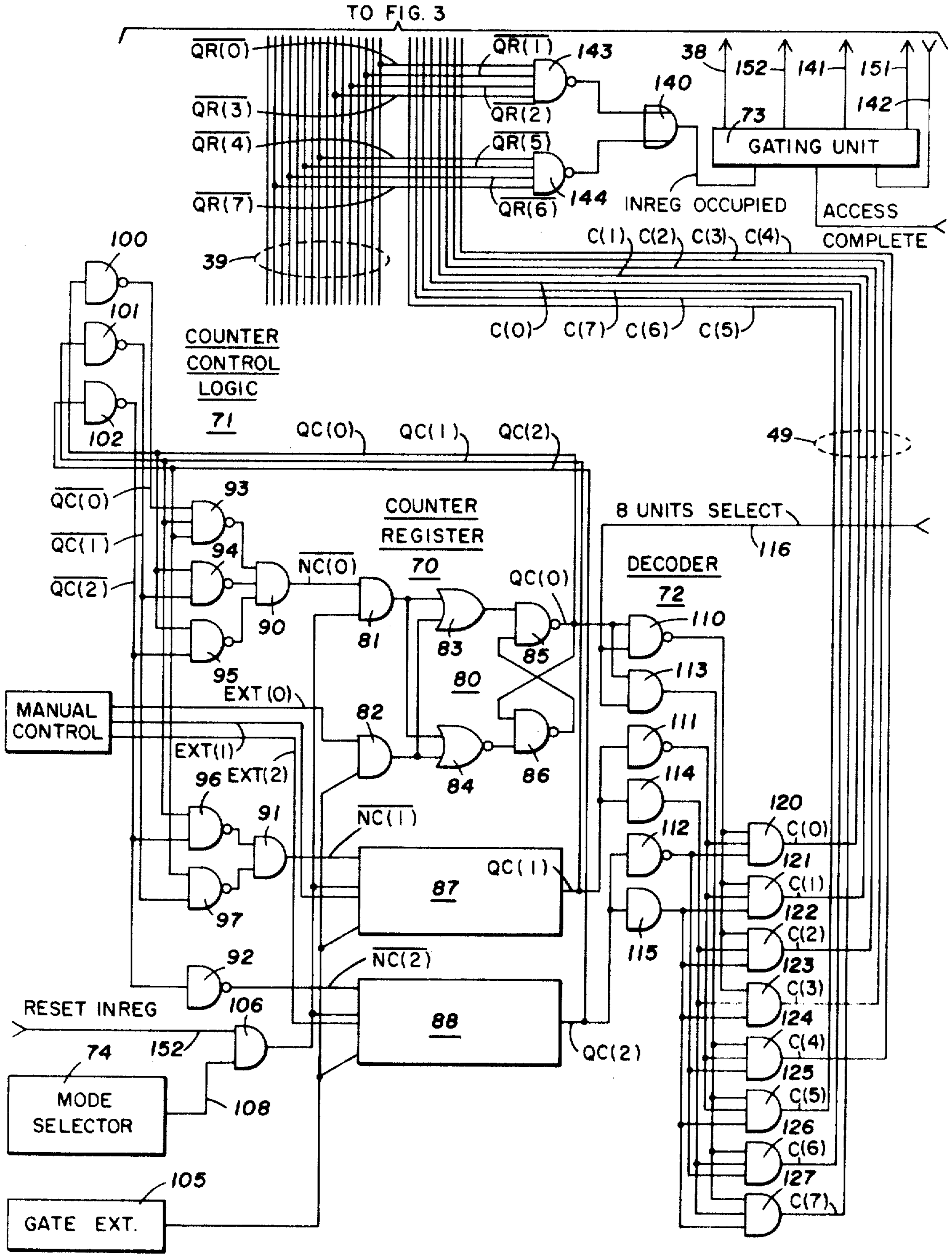
FIG. 4 illustrates the control system for the priority units of FIG. 3.

Referring now to FIGS. 3 and 4, priority unit 27 has been illustrated in detail. As in FIG. 1, the users 10—17 are illustrated at the left and the memory unit M0 is shown at the right. Users 10—17 are connected at their not or negation outputs to flip-flops 30—37, respectively, which also are provided with a gate in control line 38.

The true and false outputs of each of the flip-flops 30—37 are connected on a one-to-one basis to the sixteen lines in a bus 39. The lines in bus 39 are then selectively connected to control logic so that on a given memory access request only one of the lines leading from output flip-flops 40—47 will be true, thus only one request for memory access units will be selected honored at a time through a given priority unit. A reply line 40a connects unit 40 to unit 10. Like reply lines, partially shown, are provided from each of units 41—47 to units 11—17, respectively.

The priority unit 27 comprises eight identical sets of logic with different input and output connections to the bus 39 and to the control bus 49. Because of circuit identity, only one of the eight sets of logic has been shown in detail in FIG. 3.

The set for the case where the ordered priority 0,1...7 has been utilized with the 0 unit being shown. The unit includes eight NAND gates 50—57 and three output AND gates 58—60 and one input AND gate 61.

Gate 60 is connected at its output to one input of flip-flop 47. The two inputs to AND gate 60 are connected to the outputs of AND gates 58 and 59. The four inputs of AND gate 58 are connected to the four outputs of NAND gates 50—53. Similarly, the four inputs of AND gate 59 are connected to the four outputs of NAND gates 54—57.

The NAND gate inputs are connected as follows: NAND gate 50 has five input lines connected to C(5), $\overline{QR(5)}$, $\overline{QR(6)}$, $\overline{QR(7)}$ and QR(0).

NAND gate 51 has four inputs connected to C(6), $\overline{QR(6)}$, $\overline{QR(7)}$ and QR(0).

NAND gate 52 has three inputs connected to C(7), $\overline{QR(7)}$ and QR(0).

NAND gate 53 has two inputs connected to C(0) and QR(0).

NAND gate 54 has five inputs connected to C(1), $\overline{QR(1)}$, $\overline{QR(2)}$, $\overline{QR(3)}$ and the output of AND gate 61.

NAND gate 55 has four inputs connected to C(2), $\overline{QR(2)}$, $\overline{QR(3)}$ and the output of AND gate 61.

NAND gate 56 has three inputs connected to C(3), $\overline{QR(3)}$ and the output of AND gate 61.

NAND gate 57 has two inputs connected to C(4) and the output of AND gate 61.

AND gate 61 has five inputs connected to QR(4), QR(5), QR(6), QR(7) and QR(0).

Figures 5, 6:
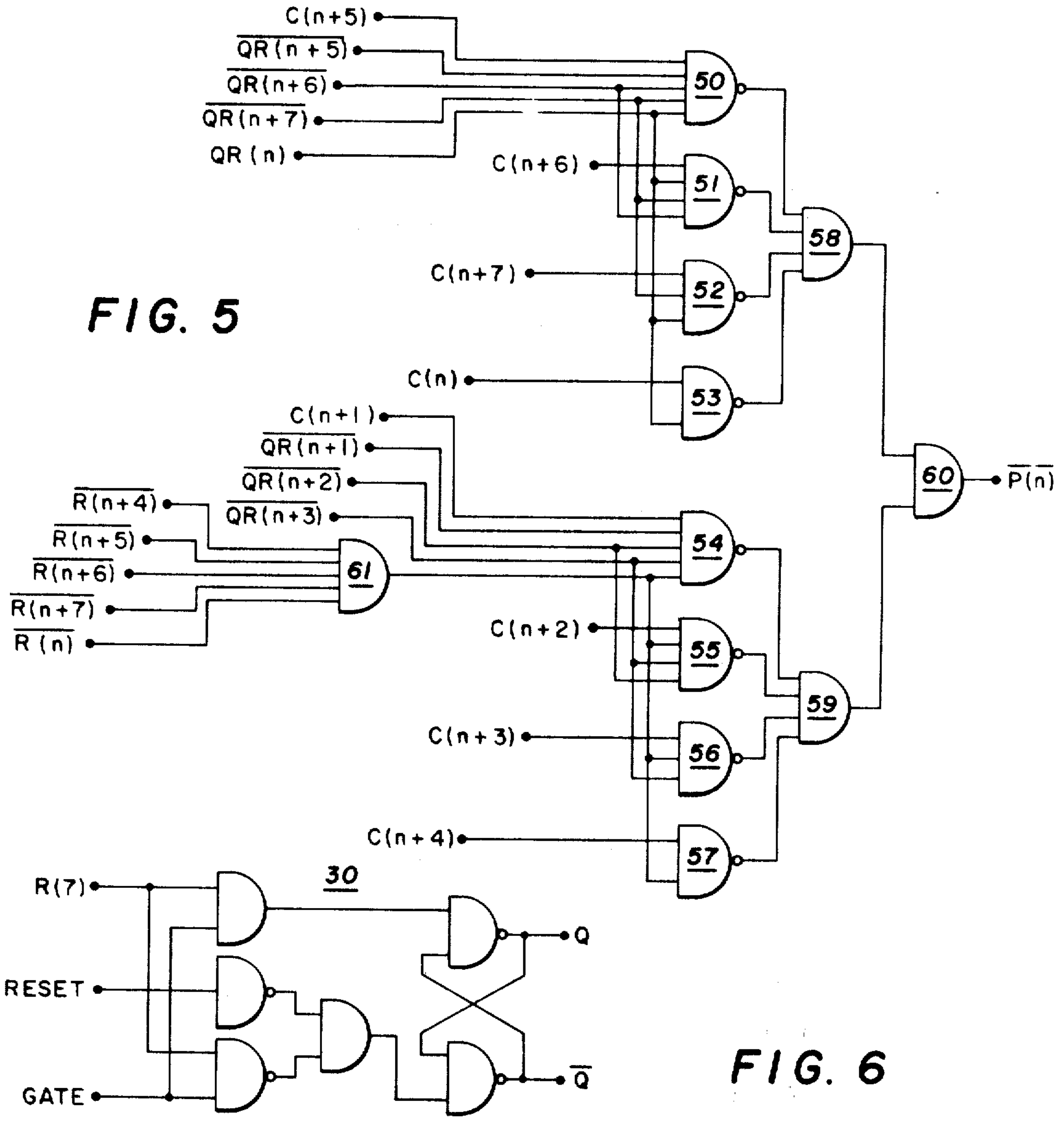
FIG. 5 illustrates the general form of the priority output generator of FIG. 3.
FIG. 6 illustrates the flip-flop circuit which in FIG. 3 is shown in block form.

The connections between the logic unit, shown in general form in FIG. 5, and the busses 39 and 49 have been shown for one specific case in FIG. 3. The general case is shown in FIG. 5 which provides a key for the connection of the other seven units 21—27, FIG. 1.

Referring now to FIG. 4, a control system includes six main modules, a counter register 70, counter control logic 71, a decoder 72, and output gating unit 73 and a mode selector unit 74 and an external gate unit 105.

The counter register 70 includes three dual flip-flops 80, 87 and 88. It will be understood that if mode selector 74 is not used so that the distributed mode only is to be employed then simple flip-flops may be employed in place of dual units 80, 87 and 88. Dual flip-flop 80 includes AND gates 81 and 82, OR gate 83, NOR gate 84 and NAND gates 85 and 86. Flip-flops 87 and 88 are identical with gate 80. The gate elements are interconnected in the conventional manner illustrated and will not be further detailed.

The counter register is controlled on input lines which will be identified by states $\overline{NC(0)}$, $\overline{NC(1)}$ and $\overline{NC(2)}$ at the outputs from AND gates 90 and 91 and NAND gate 92, respectively. AND gate 90 is connected to the output of NAND gates 93, 94 and 95. AND gate 91 is connected to the outputs of NAND gates 96 and 97.

NAND gate 93 has three inputs, one of which is line $\overline{QC(0)}$ leading from NAND gate 100. The second input is connected to line QC(1) which interconnects the input of NAND gate 101 and the output of flip-flop 87. The third input is connected to line QC(2) which interconnects the input of NAND gate 102 and the output of flip-flop 88.

NAND gate 94 has two inputs, one connected to the line QC(0) and the other connected to the line $\overline{QC(1)}$.

NAND gate 95 has two inputs, one connected to QC(0) and the other to $\overline{QC(2)}$.

NAND gate 96 has two inputs, one connected to QC(1) and the other connected to $\overline{QC(2)}$.

NAND gate 97 has two inputs, one connected to QC(2) and the other connected to $\overline{QC(1)}$.

NAND gate 91 has only one input connected to $\overline{QC(2)}$.

An external gate unit 105 is connected to the second gate input of each of flip-flops 80, 87 and 88. AN An AND gate 106 is connected to the first gate input on each of flip-flops 80, 87 and 88. AND gate 106 is controlled by mode selector 74 which has a distributed mode enable line 108. The second input to AND gate 106 is a control signal RESET INREG appearing on line 152 leading from control unit 73. When line 108 is zero, the system operates in a fixed priority mode. When line 108 is true the counter register 70 will control the system as to operate in a distributed mode.

The second data input to each of flip-flops 80, 87 and 88 are connected to lines leading to an external manual control 75 so that the priority can be selected manually when in fixed priority mode by control states EXT(0), EXT(1) and EXT(2).

The outputs of counter register 70 are connected to the decoder unit 72. Unit 72 has an input comprising NAND gates 110, 111 and 112 and AND gates 113, 114 and 115. One input to each of NAND gates 110 and AND gate 113 is supplied by line QC(0), the second input being supplied from an eight units select line 116.

The single input to NAND gate 111 and AND gate 114 is supplied by line QC(1). Similarly, the single input to NAND gate 112 and AND gate 115 is supplied by line QC(1).

The outputs of gates 110—115 are connected to the inputs of decoder AND gates 120—127 whose outputs form the bus 49.

More particularly, AND gate 120 is connected to gates 110, 111 and 112. AND gate 121 is connected to gates 110, 111 and 115. AND gate 122 is connected to gates 110, 114 and 112. AND gate 123 is connected to gates 110, 114 and 115. AND gate 124 is connected to gates 110, 113 and 112. AND gate 125 is connected to gates 113, 111 and 115. AND gate 126 is connected to gates 113, 114 and 112. AND gate 127 is connected to gates 113, 114 and 115.

Figure 8:
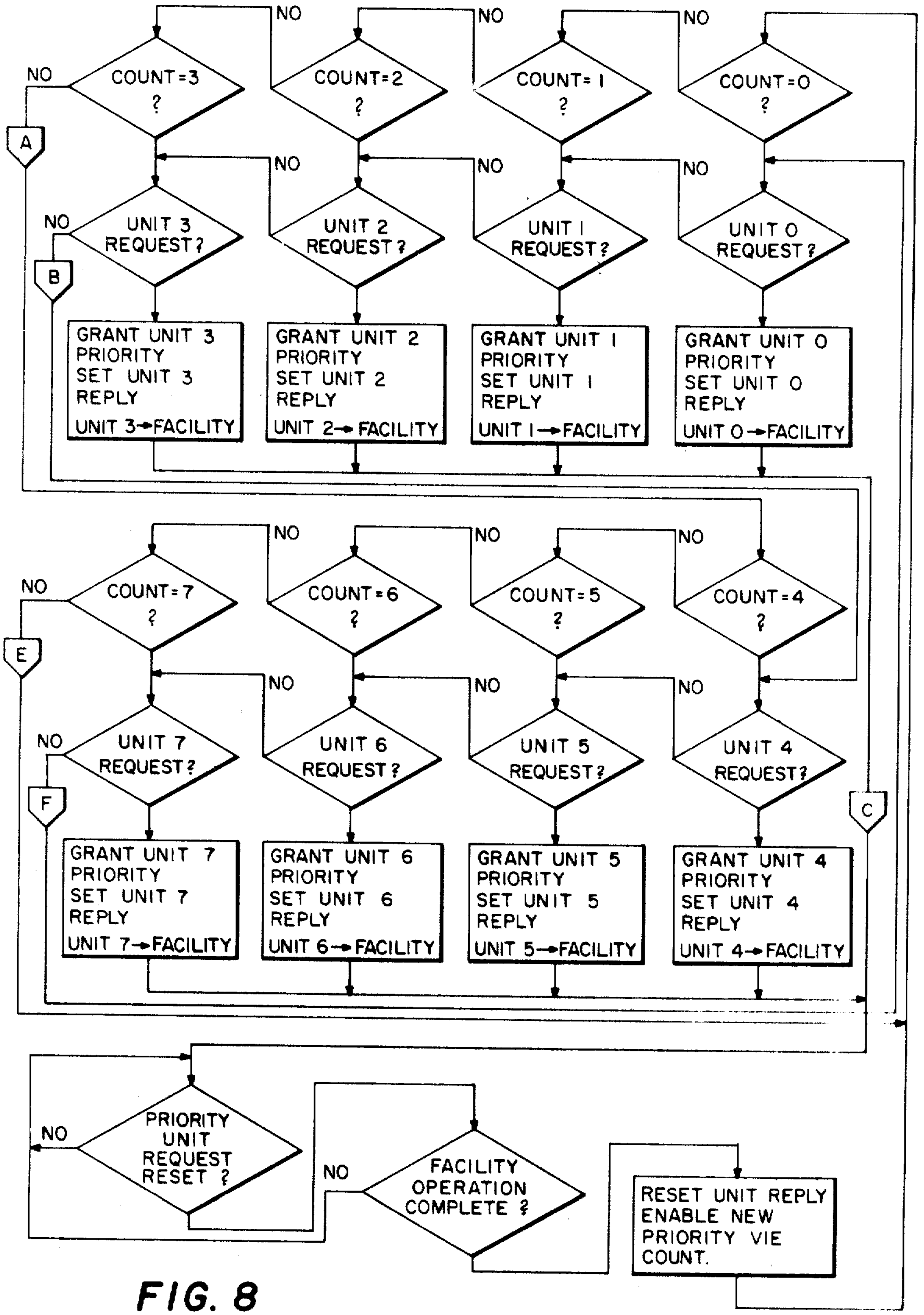
FIG. 8 is a flow diagram of the priority logic of the present invention.

The system of FIG. 3 thus far described, through the decoder 72 serves to step the priority order from [0,1...7] sequentially to [1,2...7,0], [2,3...1,0] ... ... [7,0...5,6]. A flow diagram for the priority logic unit is shown in FIG. 8, being appropriately labeled to the foregoing description. The logic, whether hardware or software implements the following logic equations.

$$P(0)=R0[C0+C7\overline{R7}+C6\overline{R6}\,\overline{R7}+C5\overline{R5}\,\overline{R6}\,\overline{R7}+C4\overline{R4}\,\overline{R5}\,\overline{R6}\,\overline{R7}+C3\overline{R3}\,\overline{R4}\,\overline{R5}\,\overline{R6}\,\overline{R7}+C2\overline{R2}\,\overline{R3}\,\overline{R4}\,\overline{R5}\,\overline{R6}\,\overline{R7}+C1\overline{R1}\,\overline{R2}\,\overline{R3}\,\overline{R4}\,\overline{R5}\,\overline{R6}\,\overline{R7}] \quad (0)$$

$$P(1)=R1[C1+C0\overline{R0}+C7\overline{R7}\,\overline{R0}+C6\overline{R6}\,\overline{R7}\,\overline{R0}+C5\overline{R5}\,\overline{R6}\,\overline{R7}\,\overline{R0}+C4\overline{R4}\,\overline{R5}\,\overline{R6}\,\overline{R7}\,\overline{R0}+C3\overline{R3}\,\overline{R4}\,\overline{R5}\,\overline{R6}\,\overline{R7}\,\overline{R0}+C2\overline{R2}\,\overline{R3}\,\overline{R4}\,\overline{R5}\,\overline{R6}\,\overline{R7}\,\overline{R0}] \quad (1)$$

$$P(2)=R2[C2+C1\overline{R1}+C0\overline{R0}\,\overline{R1}+C7\overline{R7}\,\overline{R0}\,\overline{R1}++C6\overline{R6}\,\overline{R7}\,\overline{R0}\,\overline{R1}+C5\overline{R5}\,\overline{R6}\,\overline{R7}\,\overline{R0}\,\overline{R1}+C4\overline{R4}\,\overline{R5}\,\overline{R6}\,\overline{R7}\,\overline{R0}\,\overline{R1}+C3\overline{R3}\,\overline{R4}\,\overline{R5}\,\overline{R6}\,\overline{R7}\,\overline{R0}\,\overline{R1}] \quad (2)$$

$$P(3)=R3[C3+C2\overline{R2}+C1\overline{R1}\,\overline{R2}+C0\overline{R0}\,\overline{R1}\,\overline{R2}+C7\overline{R7}\,\overline{R0}\,\overline{R1}\,\overline{R2}+C6\overline{R6}\,\overline{R7}\,\overline{R0}\,\overline{R1}\,\overline{R2}+C5\overline{R5}\,\overline{R6}\,\overline{R7}\,\overline{R0}\,\overline{R1}\,\overline{R2}+C4\overline{R4}\,\overline{R5}\,\overline{R6}\,\overline{R7}\,\overline{R0}\,\overline{R1}\,\overline{R2}] \quad (3)$$

$$P(4)=R4[Cr+C3\overline{R3}+C2\overline{R2}\,\overline{R3}+C1\overline{R1}\,\overline{R2}\,\overline{R3}+C0\overline{R0}\,\overline{R1}\,\overline{R2}\,\overline{R3}+C7\overline{R7}\,\overline{R0}\,\overline{R1}\,\overline{R2}\,\overline{R3}+C6\overline{R6}\,\overline{R7}\,\overline{R0}\,\overline{R1}\,\overline{R2}\,\overline{R3}+C5\overline{R5}\,\overline{R6}\,\overline{R7}\,\overline{R0}\,\overline{R1}\,\overline{R2}\,\overline{R3}] \quad (4)$$

$$P(5)=R5[C5+C4\overline{R4}+C3\overline{R3}\,\overline{R4}+C2\overline{R2}\,\overline{R3}\,\overline{R4}+C1\overline{R1}\,\overline{R2}\,\overline{R3}\,\overline{R4}+C0\overline{R0}\,\overline{R1}\,\overline{R2}\,\overline{R3}\,\overline{R4}+C7\overline{R7}\,\overline{R0}\,\overline{R1}\,\overline{R2}\,\overline{R3}\,\overline{R4}+C6\overline{R6}\,\overline{R7}\,\overline{R0}\,\overline{R1}\,\overline{R2}\,\overline{R3}\,\overline{R4}] \quad (5)$$

$$P(6)=R6[C6+C5\overline{R5}+C4\overline{R4}\,\overline{R5}+C3\overline{R3}\,\overline{R4}\,\overline{R5}+C2\overline{R2}\,\overline{R3}\,\overline{R4}\,\overline{R5}+C1\overline{R1}\,\overline{R2}\,\overline{R3}\,\overline{R4}\,\overline{R5}+C0\overline{R0}\,\overline{R1}\,\overline{R2}\,\overline{R3}\,\overline{R4}\,\overline{R5}+C7\overline{R7}\,\overline{R0}\,\overline{R1}\,\overline{R2}\,\overline{R3}\,\overline{R4}\,\overline{R5}] \quad (6)$$

$$P(7)=R7[C7+C6\overline{R6}+C5\overline{R5}\,\overline{R6}+C4\overline{R4}\,\overline{R5}\,\overline{R6}+C3\overline{R3}\,\overline{R4}\,\overline{R5}\,\overline{R6}+C2\overline{R2}\,\overline{R3}\,\overline{R4}\,\overline{R5}\,\overline{R6}+C1\overline{R1}\,\overline{R2}\,\overline{R3}\,\overline{R4}\,\overline{R5}\,\overline{R6}+C0\overline{R0}\,\overline{R1}\,\overline{R2}\,\overline{R3}\,\overline{R4}\,\overline{R5}\,\overline{R6}] \quad (7)$$

The output gating unit 73 has three inputs and four outputs. The first input signal indicates whether or not the input register is occupied. This signal appears at the output of OR gate 140 which is fed by NAND gates 143 and 144. The NAND gates 143 and 144 are connected to the FALSE outputs of flip-flops 30—37. The second input signal indicates whether or not a memory access cycle is complete. This signal appears on line 145 and is produced by the memory control unit of the computer (not shown). The third input signal indicates whether or not the output register is occupied. The latter signal appears on line 142 leading from an OR gate **142*a* connected to the output of each of the flip-flops 40—47**.

The first output line 38 from the gating unit 73 provides a GATE INREG signal to open gates 30—37. The second output appears on line 152. This signal RESET INREG serves to reset fliprflops 30—37.

The third output signal from unit 73 appearing on line 141 gates the output registers 40—47. The fourth output signal RESET OUTREG from unit 73 appears on line 151 and serves to reset the output registers 40—47.

Figure 7:
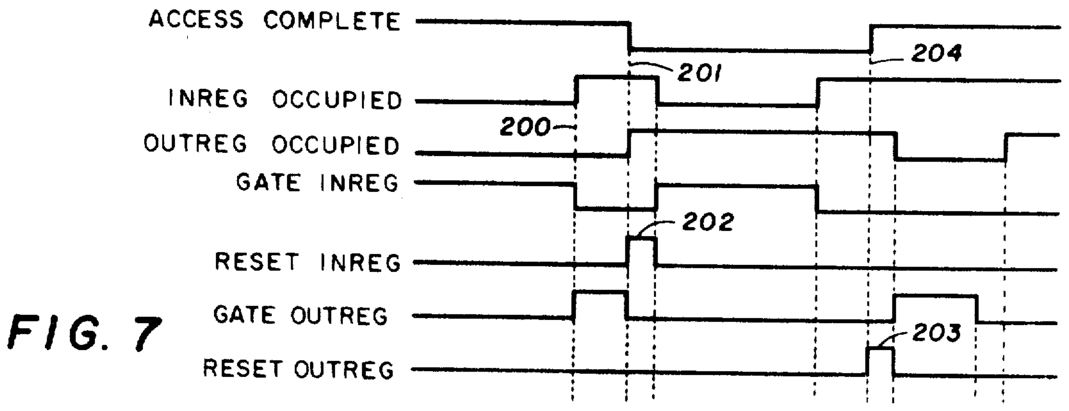
FIG. 7 is a time diagram for gating unit 73.

The sequence of the signals to and from gating unit 73 is illustrated in FIG. 7. When an access request is made the state on line 38 changes from a FALSE to a TRUE state (from zero to one) as indicated at time 200. However, the line 145 in a TRUE state until time 201 indicates that the access request cannot be honored until time 201. The signal on line 142 is FALSE to time 201 and then becomes TRUE. In response to these signals, the signal on line 38 is the negation of the signal from OR gate 140. The signal on line 141 becomes TRUE at time 200 to gate the output registers 40—47. When the memory access cycle is complete, the signal on line 141 is returned FALSE and the input register is reset as by pulse 202 on line 152. The output register is reset by pulse 203 at time 204 and coincident therewith the memory access complete line 145 is made TRUE. At the termination of pulse 203 the output gate register line 141 goes TRUE and the output register occupied line becomes FALSE.

With the foregoing gating sequence there will be produced on only one of the output lines from flip-flops 40—47 a FALSE state indicating that one of the users has won in its vie for priority, thus enabling the memory unit MO to respond to that user. If user 10 has won then the state at the output of flip-flop 40 will be TRUE and that voltage state will be signaled by way of reply line **40*a* to user 10 so that user 10 may then release its memory request. Conversely, if user 37 wins the vie, then the state at the output of gate 47 is transmitted to user 17 so that user 17** will release its memory request.

In operation, at time 200 FIG. 7, assume that a memory access request is signaled by one or more of units 10—17 by the appearance of a FALSE state on one or more of the output lines leading to gates 30—37. Since the output register is occupied, the signal on line 152 is driven FALSE because the previous access is not complete until time 201. As a consequence of the appearance of the input access request, the output registers are gated TRUE at time 200 with the appearance of a TRUE state on line 141.

Upon the completion of the previous memory access at time 201, the state on line 145 returns to FALSE, whereupon the input register is reset at the trailing edge of pulse 202. In the interval of pulse 202 the counter register 70, operating in conjunction with the counter control logic 71 and decoder 72, supplies voltage states on lines 49 which are utilized along with the voltage states on line 39 by the priority unit 20 to produce a FALSE output of AND gate 60 (assuming that the fixed priority sequence is 0,1...7).

It will be noted that line 152 implementing reset of the input register is also shown in FIG. 4 and leads to AND gate 106 which serves to advance counter register 70 one count for each memory access cycle, thus, in the succeeding memory access cycle the fixed priority would be 1,2...7, 0 and the output of AND gate 60 would be FALSE. One of the other users could then win the vie for priority simply because of the change in the output of the decoder 72 responsive to incrementing the count-in-count register 70.

We claim:

1. An automatic data processing computer having a plurality of users therein vying for access to a given element of said computer, a. signal channels interconnecting all said users with said element;

b. control units, one for enabling each of said signal channels;

c. a logic unit for establishing a fixed priority sequence for access to said element;

d. counter means for sequentially shifting the starting point in the of said logic unit; and e. means responsive to a signal bearing predetermined relation to completion of a previous requested access to said element for incrementing said counter to shift the priority one step in said sequence.

2. A system for control of priority of access to a memory module in a digital computer where N users vie for access thereto which comprises:

a. means for establishing a fixed priority sequence as between said users;

b. counter means establishing a counting cycle of order N;

c. actuating means for stepping one count in said counting cycle following each access to said memory module in response to each of a plurality of a plurality of successive memory access complete cycles; and d. means responsive to said counter means upon each incrementing of said cycle for shifting the priority starting point one step in said sequence.

3. A distributed priority system for the control of priority of access to a computer memory module as between N users where an access request signal and an access complete signal are employed which comprises:

a. a priority unit having N logic modules, b. an access request signal distribution bus, c. input flip-flops, one connecting each user selectively to channels in said bus for applying access request signals thereto, d. output flip-flops, one connecting each logic module to said memory module, e. connections between said channels and said logic modules to fix a priority sequence between said users and connection between said logic modules and said output flip-flops for enabling only one of said output flip-flops at any time, f. a counter for cycling through a count of N, g. a decode logic unit responsive to said counter having N output lines selectively connected to each of said logic modules for control of the starting point in said priority sequence, and h. means responsive to each said access complete signal for incrementing said counter to shift the starting point in said priority sequentially therethrough.

4. The combination as set forth in claim 3 wherein said signal distribution bus has 2N channels and each of said flip-flops connect to said bus at both true and bus at both true and false outputs for applying access request signals and access negation signals thereto, and wherein said connections between said channels and said logic modules employ both true and false outputs.

5. The combination set forth in claim 3 wherein means are provided for switching said system to one of fixed priority and wherein manual means connect to said counter for establishing the user of highest priority.

6. The combination set forth in claim 3 wherein N priority units are provided, each with a distribution bus and wherein each said distribution bus has 2N channels, each set of said flip-flops connect to said bus at both true and false outputs for applying access request signals and negations thereof thereto and wherein said connections between said bus and each of said logic modules employ both true (R) and false ($\overline{R}$) outputs of said flip-flops, the true outputs (C) of said decode logic to perform the logic functions in producing output state (P) in accordance with the following pattern of logic equations:

$$P(0) = R0[C0 + C7\overline{R7} + C6\overline{R6}\,\overline{R7} + C5\overline{R5}\,\overline{R6}\,\overline{R7} + C4\overline{R4}\,\overline{R5}\,\overline{R6}\,\overline{R7} + C3\overline{R3}\,\overline{R4}\,\overline{R5}\,\overline{R6}\,\overline{R7} + C2\overline{R2}\,\overline{R3}\,\overline{R4}\,\overline{R5}\,\overline{R6}\,\overline{R7} + C1\overline{R1}\,\overline{R2}\,\overline{R3}\,\overline{R4}\,\overline{R5}\,\overline{R6}\,\overline{R7}],$$

$$P(1) = R1[C1 + C0\overline{R0} + C7\overline{R7}\,\overline{R0} + C6\overline{R6}\,\overline{R7}\,\overline{R0} + C5\overline{R5}\,\overline{R6}\,\overline{R7}\,\overline{R0} + C4\overline{R4}\,\overline{R5}\,\overline{R6}\,\overline{R7}\,\overline{R0} + C3\overline{R3}\,\overline{R4}\,\overline{R5}\,\overline{R6}\,\overline{R7}\,\overline{R0} + C2\overline{R2}\,\overline{R3}\,\overline{R4}\,\overline{R5}\,\overline{R6}\,\overline{R7}\,\overline{R0}],$$

and $$P(2) = R2[C2 + C1\overline{R1} + C0\overline{R0}\,\overline{R1} + C7\overline{R7}\,\overline{R0}\,\overline{R1} + C6\overline{R6}\,\overline{R7}\,\overline{R0}\,\overline{R1} + C5\overline{R5}\,\overline{R6}\,\overline{R7}\,\overline{R0}\,\overline{R1} + C4\overline{R4}\,\overline{R5}\,\overline{R6}\,\overline{R7}\,\overline{R0}\,\overline{R1} + C3\overline{R3}\,\overline{R4}\,\overline{R5}\,\overline{R6}\,\overline{R7}\,\overline{R0}\,\overline{R1}],$$

etc.

7. A distributed priority system with a controlled priority of access to a computer element between N users where an access request signal and an access complete signal are produced for each access operation which comprises:

a. a priority unit for each said element having N logic modules therein;

b. an access request signal distribution bus in each said priority unit;

c. access request signal gates, one connecting each said user to a pair of channels in said bus for applying true and false access request signals thereto;

d. connections between logic input terminals of each of said logic modules and more than half but less than all of said channels in said bus with said connections to each logic module differing from the connections to any other logic module in an array which fixes a predetermined priority sequence between said users;

e. output gates, one connecting the output of each logic module to one input to said element;

f. a counter establishing a count at least equal to $\sqrt{N}$;

g. a decoder in each logic module having N output lines leading to enable terminals in said logic module for producing an output from only one of said logic modules for each access request signal; and h. an output gating unit in each logic module connected to N channels in said bus and to an access complete signal channel for enabling all of said output gates following completion of each previous access operation.

8. The method of control of priority of access to a memory module in a digital computer where N users vie for access thereto which comprises:

a. establishing a fixed priority sequence as between said users;

b. establishing a counting cycle of order N;

c. stepping one count in said counting cycle following completion of each access to said memory module in response to each of a plurality of successive memory access complete signals; and d. in response to incrementing said counting cycle, shifting the priority starting point one step in said sequence.